3,467,310
TRACK MEANS FOR WHEELED VEHICLES
R. Lee Fraser, 3723 Northwood Drive,
Memphis, Tenn. 38111
Filed Oct. 24, 1967, Ser. No. 677,686
Int. Cl. E01b 25/28, 26/00
U.S. Cl. 238—4                                6 Claims

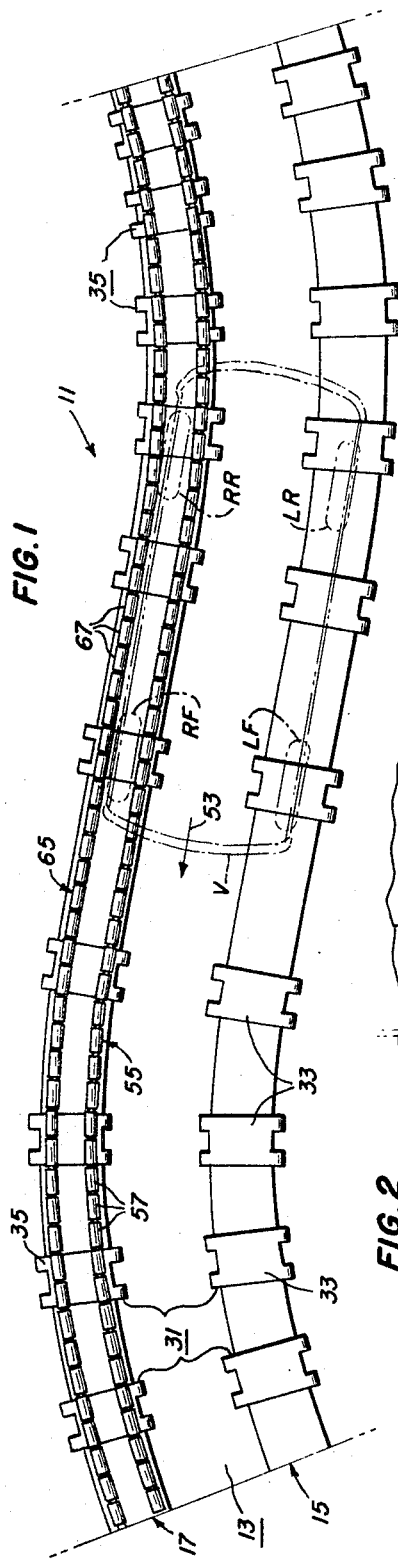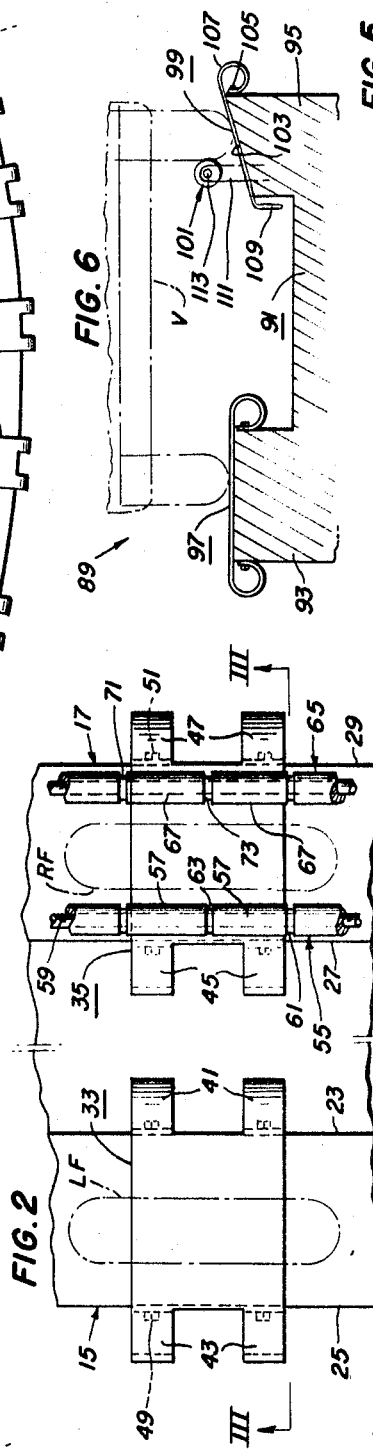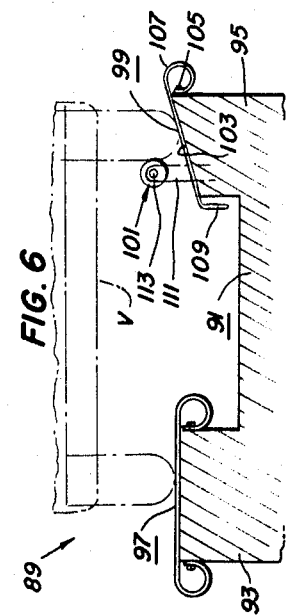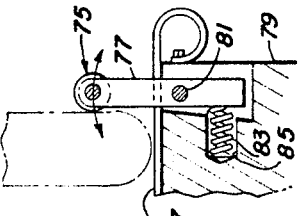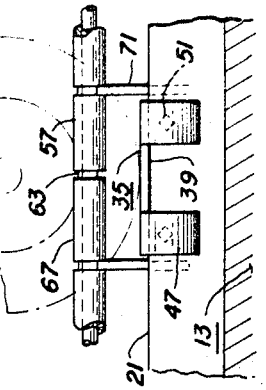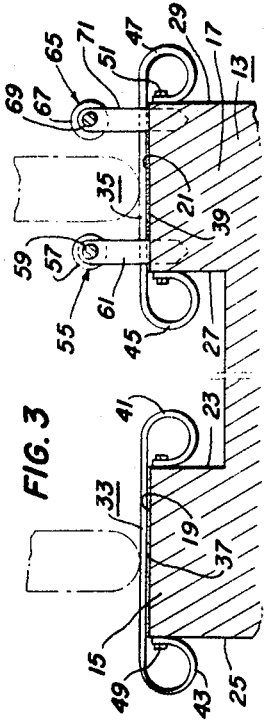
INVENTOR.
R LEE FRASER
BY John R. Walker, III
Attorney United States Patent Office 3,467,310
Patented Sept. 16, 1969

ABSTRACT OF THE DISCLOSURE

Track means for guidingly constraining wheeled vehicles including a pair of treadways for runningly supporting the vehicle in travel. The main embodiment of the invention including two longitudinally extending parallel strings of rollers extending along the top side of one of the treadways; the track structure being operably adapted to conduct a driverless automobile or the like from one location to another location and in so doing the wheels on one side only of the automobile or the like being guided.

BACKGROUND OF THE INVENTION

*Field of the invention.*—It pertains generally to guiding structures for wheeled vehicles. The invention particularly concerns track means incorporated in automobile washing apparatus, parking garages, storage facilities or the like.

*Description of the prior art.*—The typical means for conducting a driverless vehicle along a certain course is to cause both right and left wheels of the vehicle to run in upwardly flanged trackways. The typical way of guiding a vehicle is to employ right and left inside runway flanges which runningly engage the inner side walls respectively of the right and left wheels of the vehicle; or conversely, to employ right and left outside flanges which runningly engage the outer side walls respectively of the right and left wheels. The disadvantage of this type guiding means is the difficulty experienced in guiding vehicles having various tread widths and also guiding vehicles having wheels of various tire sizes or wheel width. A further problem experienced with vehicle track structures was the considerable effort required to move the vehicle along the track. Also, the prior art apparently does not disclose a practical means for conducting a driverless vehicle around a relatively sharp turn or corner.

SUMMARY OF THE INVENTION

The present invention, by directly guiding the wheel members effectively on one side only of a vehicle may readily guide vehicles having a wide range of tread widths. By utilizing a parallel pair of segmented strings of rollers along one treadway of the track structure, a more efficient guide structure is provided. The oppositely arranged parallel strings of rollers along one of the track treadways engage opposite sidewall surfaces of the wheels only on one side of the vehicle and efficiently direct the vehicle along the track structure. Less tractive effort is required to move the vehicle along the track structure of the present invention as compared with previous structures having rigid wheel engaging flanges. The track structure of the present invention is effective for guiding vehicles having: (1) wheels fixedly journaled as on the rear axles of the typical automobile; (2) vehicles having steerable front wheels as the front wheel mounting on a typical automobile; (3) vehicles having caster-type mounting for the steering wheels of the vehicle.

BRIEF DESCRIPTION OF THE DRAWING

FIG. 1 is a plan view of the track structure of the present invention.

FIG. 2 is an enlarged plan view of a longitudinal fragmentary portion of the track structure shown in FIG. 1.

FIG. 3 is a transverse vertical sectional view of the track structure taken as on line III—III of FIG. 2.

FIG. 4 is a side elevational view of that portion of the track structure shown in FIG. 2.

FIG. 5 is a view illustrating a modification of the guide roller means of the track structure.

FIG. 6 is a second modification of the track structure of the invention.

DESCRIPTION OF THE PREFERRED EMBODIMENT

The preferred embodiment of the present invention is illustrated in track section 11 and in FIGS. 1–4. An automotive vehicle, indicated V, is illustrated in the drawings and will be described in conjunction with track section 11. Although the track section is of S-curved configuration, it will be understood that this track configuration is for purposes of description only and the desired course or configuration of a particular track in actual practice will be determined by the particular application of the invention.

The base of track section 11 is indicated by numeral 13 and includes structure forming a left treadway 15 and a right treadway 17. Treadways 15, 17 are uniformly spaced apart and extend the full length of the track section. Treadways 15, 17 include respectively horizontal top surfaces 19, 21 and inwardly and outwardly disposed vertical surface 23, 25 and 27, 29.

Upwardly directed generally horizontally movable wheel supporting means are provided along each treadway 15, 17 and are preferably arranged intermittently along the respective treadways: A plurality of pairs 31 of skid pads 33, 35 are arranged respectively intermittently along left and right treadway structures 15, 17. Each pair 31 of skid pads are directly transversely spaced apart relative to track section 11 and are adapted to be simultaneously engaged respectively by left and right front wheels LF, RF and left and right rear wheels LR, RR of vehicle V. Skid pads 33, 35 are preferably formed of plate material and are movably mounted respectively on top surfaces 19, 21 of treadways 15, 17. Antifriction means which is preferably in the form of grease lubricant 37, 39 is placed sheet-like between skid pads 33, 35 and treadways 15, 17. Skid pads 33, 35 are adapted to move transversely respectively of treadways 15, 17 and also each includes spring means for resiliently urging each skid pad to a transversely centered position relative to its supporting treadway.

Skid pads 33, 35 include respectively paired downturned inwardly and outwardly disposed coil portions 41, 43 and 45, 47. Coil portions 41, 43, 45, 47 respectively of pads 33, 35 are rolled downwardly and inwardly and are secured respectively with bolts 49, 51. Each coil portion is secured at the distal end thereof by a bolt extending respectively into the vertical wall surfaces 23, 25, 27, 29 of treadways 15, 17. Coil portions 41, 43, 45, 47 are each formed of resilient material and yieldably urge the respective pads to a centered position relative to the respective treadways.

First and second guide means arranged along right treadways 17 limit respectively movement of vehicle V to the left or right as the vehicle moves along the track section in the direction indicated by arrow 53. First guide means guidingly constrains vehicle V from movement toward the left and includes a segmented string 55 of roller members 57 preferably extending the full length of right treadway 17. A single axle 59 and a plurality of intermittently spaced standards 61 stationarily journal roller string 55 along the inward edge of treadway 17. Standards 61 are embedded or otherwise fixedly secured in treadway 17 and support axles 59 and rollers 57 in parallel arrangement with the top surface of treadway 17. Annular spacers 63 are arranged between adjacent rollers 57 at that portion of roller string 55 wherein the rollers span skid pads 35. Standards 61 and spacers 63 may be alternately or optionally utilized in roller string 55 as desired. In certain instances, it may be desirable to omit spacers 63.

Rollers 57 are shown as being equal length and all rollers alike. This has been shown thusly for purposes of clarity in description. It will be understood that in certain applications and in certain track configurations, the length of the rollers may be varied. It will be apparent that a roller acting to guide a vehicle wheel along a sharply curved path would be a shorter roller than a roller guiding the vehicle along a substantially straight path. It should be noted also that the rollers should be short enough to engage only the forward or rearward portion of a left or right sidewall portion of a tire. Since as a tire rotates the forward wall portion moves downwardly and the rearward wall portion moves upwardly, it is desirable that separate adjacent rollers engage the forward and rearward wall portions of a tire sidewall. Having rollers of a length short enough to accomplish this is particularly desirable in guiding the vehicle around a substantially sharp turn.

The second guide means of track section 11 guidingly constrains vehicle V against movement to the right relative to the track structure and in a direction opposite from the first guide means. The second guide means in the preferred embodiment includes a segmented string 65 of rollers 67 arranged oppositely from string 55 of rollers 57. Roller string 65 includes an axle 69 journaling the rollers in axial alignment and includes standards 71 and spacer 73. Standards 71 supportingly engage axle 69 and support the roller string from treadway 17 along the right upper edge portion of the treadway. The rollers of roller strings 55, 65 preferably are transversely correspondingly arranged relative to treadway 17 and each roller 67 of roller string 65 is preferably laterally aligned with a roller 57 of roller string 55.

Roller string 55 is adapted to runningly engage the left sidewall portions respectively of the wheel tires of right front and right rear wheels of vehicle V. In like manner the right sidewall portions respectively of the tire wheels of right front and right rear wheels of the vehicle is adapted to runningly engage roller string 65. The distance between roller strings 55, 65 is greater than the width of the wheels of the vehicle V so that the wheels don't necessarily engage continuously one of strings 55 or 65, in preference to the other but may wander back and forth between the roller strings 55, 65. When the vehicle is shifted laterally by guide means roller strings 55, 65, skid pads 33, 35 freely permit shifting movement of the wheels transversely of track 11. In addition, pads 33 and 35 are adapted to not only move transversely but may twist or move in any direction parallel to the surfaces 19, 21 of the supporting treadways 15, 17. This movement of the pads 33 and 35 gives a similar effect to that of being on ice. Thus, when the wheels are on the skid pads, they can be easily moved laterally, rotated for guiding, or rotated and laterally moved in combination.

In the modification shown in FIG. 5 a roller string 75 is adapted to be yieldably urged toward the vehicle wheel. Such an arrangement may be used in one or both the guide means illustrated in the preferred embodiment above described. A plurality of standards 77 (one shown) mounted from treadway base structure 79 from horizontal pins 81 pivotally support roller 75 for movement transversely of treadway base 79. A compression spring 83 supportingly received in socket 85 in base 79 yieldably urges roller string 75 toward the vehicle wheel. Skid pad 87 mounted on base 79 permits movement of the vehicle wheel relative to the base structure, as heretofore described relative to the preferred embodiment. The modification illustrated in FIG. 5 is particularly useful in obtaining a continuous guiding action on the vehicle and firmly guides the vehicle along a desired path. Primarily, the embodiment illustrated in FIG. 5 provides for a larger variation in wheel width and reduces the wandering of narrow wheels. It will be understood that roller string 75 does not necessarily remain in contact with the wheels.

The embodiment 89 indicated in FIG. 6 includes a base structure 91 including left and right treadways 93, 95; skid pads 97, 99 and a segmented roller string 101. Left skid pad 97 is of the same configuration as previously described in the preferred embodiment and is slidably mounted on the top surface of left treadway structure 93. Right treadway structure 95 of embodiment 89 includes a transversely slanted surface 103 extending along treadway 95 and slanted downwardly and inwardly relative to base strucure 91. Skid pad 99 is transversely mounted on slanted surface 103 and is yieldably secured by bolts 105 extending through skid pad coil portions 107. The downwardly slanting distal end edge 109 of pad 99 is unattached but spaced from treadway 95 sufficiently to permit movement of the pad. If desired, the distal edge may be yieldably secured to treadway 95 in the same manner as the opposite edge coil portions 107. By the same token, the pads of the other embodiments may be either attached along one or both edges.

Standards 111 (one shown) arranged on opposite ends of pads 99 engage roller axle 113 and support the roller string 101 at a desired elevation relative to treadway 95. A vehicle traveling on the trackway of embodiment 89 is caused to move to the left as viewed in FIG. 6 or downhill by gravity by the slanted supporting surface 103 of the treadway and the slanted surfaces of pads 99. Roller string 101 engages the left sidewall portions of the tires intermittently or continuously depending upon the conditions of the vehicle, such as turning, centrifugal force, speed, etc., and permits free forward movement of the vehicle while limiting lateral movement to the left.

Now while I have shown and described exemplary embodiments of the present invention, it will be understood that various modifications and rearrangements of structure may be made without departing from the scope of the invention.

I claim:

1. A section of track for guidingly conducting a vehicle having wheels, said section of track comprising base means including structure forming at least a pair of spaced apart raised treadways extending along said track with each treadway having a horizontal top surface, skid means movably supported from at least one of said treadways for universal horizontal movement substantially parallel to the top surface of said one of said treadways and in position for at least one of said wheels to be movably supported thereby, and guide means adjacent one treadway only of said pair of treadways for guidingly limiting bidirectional lateral movement of at least one of said wheels of the vehicle relative to said pair of treadways.

2. A section of track for guidingly conducting a vehicle having a plurality of pairs of transversely spaced wheels, said section of track comprising base means including structure forming substantially a transversely spaced pair of treadways extending the length of said section of track and including a left and a right treadway and including first guide means arranged along one only of said treadways and adapted for guidingly engaging one of the wheels of each of said pair of wheels and constraining said pair of wheels against movement in one lateral direction relative to said left and right treadways and with said first guide means including a segmented string of axially aligned roller members extending the length of said one of said treadways and with each roller member being journaled along an axis extending along a side and at a level above said one of said treadways and with said string of roller members being adapted to rollingly engage the sidewalls of said one of the wheels of each of said pair of wheels and including second guide means arranged along said one only of said treadways and adapted for guidingly engaging said one of the wheels of each of said pair of vehicle wheels and constraining said pair of wheels against lateral movement in the opposite direction from the direction of wheel movement constrained by said first guide means.

3. The track structure of claim 2 which additionally includes upwardly directed movable wheel supporting surface means including a plurality of intermittently spaced pairs of skid pads including in each pair thereof a right and a left skid pad arranged transversely over respectively said right and left treadways, antifriction means arranged respectively between each skid pad and said right and left treadways supporting said skid pads respectively on the right and left treadways, and spring means for resiliently urging each skid pad to a transversely centered position relative to its supporting treadway including downturned inwardly and outwardly disposed coil portions operatively arranged respectively between each skid pad and its supporting treadway structure.

4. The structure of claim 3 wherein said second guide means includes means defining a laterally slanting vehicle wheel supporting surface extending longitudinally along said one only of said treadways; said slanting vehicle wheel engaging surface being adapted to cause said one of the wheels of each of said wheels running on said surface to be moved towards the string of rollers of said first guide means.

5. The structure of claim 3 wherein said second guide means includes a segmented string of axially aligned roller members extending the length of said one of said treadways, spaced generally parallel to said string of rollers of said first guide means, and arranged along the opposite side of said one of said treadways from said string of rollers of said first guide means; said string of rollers of said second guide means being adapted to rollingly engage the opposite sidewall of said one of said pair of wheels of said vehicle from the wheel sidewall engaged by the rollers of said first guide means.

6. The structure of claim 4 which includes spring means for yieldably urging said string of rollers of said second guide means towards said string of rollers of said first guide means.

References Cited

UNITED STATES PATENTS

| | | | |
|---|---|---|---|
| 1,805,211 | 5/1931 | Geiger | 238—3 |
| 2,924,389 | 2/1960 | Anderson | 238—4 |
| 3,042,309 | 7/1962 | Smith et al. | 238—4 |
| 3,218,991 | 11/1965 | Wehner | 238—10 |

ARTHUR L. LA POINT, Primary Examiner

RICHARD A. BERTSCH, Assistant Examiner